US012793692B2

(12) United States Patent
Lam et al.

(10) Patent No.: US 12,793,692 B2
(45) Date of Patent: Nov. 10, 2026

(54) ATTRIBUTE UTILIZATION TO DELIVER IMMERSIVE SIMULTANEOUS SOUND EXPERIENCE

(71) Applicant: Atieva, Inc., Newark, CA (US)

(72) Inventors: Michael Lam, San Jose, CA (US); Arvind Agrawal, San Jose, CA (US); Antonios Karalis, Palo Alto, CA (US)

(73) Assignee: Atieva, Inc., Newark, CA (US)

( * ) Notice: Subject to any disclaimer, the term of this patent is extended or adjusted under 35 U.S.C. 154(b) by 54 days.

(21) Appl. No.: 18/705,080

(22) PCT Filed: Oct. 28, 2022

(86) PCT No.: PCT/US2022/078871
§ 371 (c)(1),
(2) Date: Apr. 26, 2024

(87) PCT Pub. No.: WO2023/077067
PCT Pub. Date: May 4, 2023

(65) Prior Publication Data

US 2024/0420674 A1 Dec. 19, 2024

Related U.S. Application Data

(60) Provisional application No. 63/263,296, filed on Oct. 29, 2021.

(51) Int. Cl.
*G06F 3/16* (2006.01)
*G10K 15/04* (2006.01)
*H04R 3/12* (2006.01)

(52) U.S. Cl.
CPC ............. *G10K 15/04* (2013.01); *G06F 3/165* (2013.01); *H04R 3/12* (2013.01); *H04R 2499/13* (2013.01)

(58) Field of Classification Search
CPC .... H04R 3/12; H04R 2499/13; G10K 11/178; G10K 15/04; G06F 3/165
See application file for complete search history.

(56) References Cited

U.S. PATENT DOCUMENTS 5,371,802 A 12/1994 McDonald et al.
8,204,614 B2 * 6/2012 Yamashita ................ H04S 3/02 381/98

(Continued)

FOREIGN PATENT DOCUMENTS

WO 2012097150 A1 7/2012

OTHER PUBLICATIONS

International Search Report and Written Opinion for PCT Application No. PCT/US2022/078871, mailed on Jan. 18, 2023, 12 pages.

*Primary Examiner* — Disler Paul
(74) *Attorney, Agent, or Firm* — Brake Hughes Bellermann LLP

(57) ABSTRACT

A vehicle includes a plurality of loudspeakers, memory storing pre-stored sound files, encoding a sound for rendering by the loudspeakers, memory storing an attribute file containing attributes associated with the sounds and associated with audio streams, the attributes defining parameters for rendering each of the sounds and audio streams. An audio manager is configured for receiving the pre-stored sound files, audio streams, and attributes from the attribute file, the received attributes corresponding to the received pre-stored sound files and audio files. The audio manager is configured for, based on the received attributes, determining relative priorities for rendering the received pre-stored sound files and audio streams. An audio mixer is configured for, based on the determined relative priorities, outputting signals to the loudspeakers to render the received pre-stored sound files and audio streams according to the determined relative priorities.

19 Claims, 5 Drawing Sheets

(56) References Cited

U.S. PATENT DOCUMENTS

| | | | | |
|---|---|---|---|---|
| 9,031,226 | B2 * | 5/2015 | Chukka | H04W 4/80<br>381/370 |
| 10,951,987 | B1 * | 3/2021 | Ho | H04R 1/028 |
| 11,593,064 | B2 * | 2/2023 | Denis | G06F 3/165 |
| 11,670,274 | B2 * | 6/2023 | Fong | B64U 50/13<br>381/71.1 |
| 12,166,518 | B2 * | 12/2024 | Pandina | G06F 3/165 |
| 12,167,095 | B2 * | 12/2024 | Delépine | G06F 21/16 |
| 12,596,523 | B2 * | 4/2026 | Denis | G06F 3/165 |
| 2004/0034455 | A1 | 2/2004 | Simonds et al. | |
| 2010/0266135 | A1 | 10/2010 | Theobald et al. | |
| 2012/0321112 | A1 * | 12/2012 | Schubert | H04R 25/43<br>381/312 |
| 2013/0006769 | A1 | 1/2013 | Schalk et al. | |
| 2013/0343547 | A1 * | 12/2013 | Pahuja | H04H 40/36<br>381/2 |

* cited by examiner

| ID | Function | Notes | Pipeline # | Rank | Duck Others | Delta loudness of the lower | Minimum Loudness of ducked | Loudness | Min Volume | Max Volume | Routing to speaker groups | Seat Focus for Output | Sound Format |
|---|---|---|---|---|---|---|---|---|---|---|---|---|---|
| 1 | FCW + FAEB - Phase 1 | 70dB | Chime 2 | 12 | Exclusive | N/A | N/A | 180 | N/A | N/A | ALL | ALL | 2.0 |
| 2 | FCW + FAEB - Phase 2 | 78dB | Chime 2 | 12 | Exclusive | N/A | N/A | 200 | N/A | N/A | ALL | ALL | 2.0 |
| 3 | CTP - Front -- Phase 1 | 68dB | Chime 3 | 6 | No | 0 | N/A | 200 | 130 | 200 | C | N/A | 1.0 |
| 4 | CTP - Front -- Phase 2 | 81dB | Chime 2 | 9 | Yes | -70 | N/A | 210 | 130 | 200 | LR | N/A | 2.0 |
| 5 | L_TURN_SIG_TIK | | L_C | 7 | No | 0 | N/A | 160 | N/A | 170 | LC | N/A | 2.0 |
| 6 | L_TURN_SIG_TOK | | L_C | 7 | No | 0 | N/A | 160 | N/A | 170 | LC | N/A | 2.0 |
| 7 | Phone ring | | Chime 1 | 7 | Yes | -70 | N/A | 180 | 130 | 200 | ALL | ALL | 5.1 |
| 8 | TPMS (low TP) | | Chime 3 | 8 | No | 0 | N/A | 200 | 130 | 200 | ALL | ALL | 1.0 |
| 9 | Seatbelt Anouncement | | ADAS_C | 7 | No | 0 | N/A | 250 | N/A | 200 | ALL | ALL | 1.0 |
| 10 | *Trunk - Activation* | 60dB | ADAS_Lrs+Rrs | 6 | No | 0 | N/A | 170 | 130 | 200 | ALL | ALL | 2.0 |
| 11 | *Door Ajar while car is moving* | 63dB | Chime 1 | 9 | Yes | -50 | N/A | 200 | 130 | 200 | LR | N/A | 5.1 |
| 12 | Stereo Media | | Media | 2 | No | 0 | | Variable | 0 | | ALL | X,Y Panner | Stereo |
| 13 | Tidal-Atmos | | Atmos Media | 2 | No | 0 | | Variable | 0 | | ALL | | 7.1.4 |
| 14 | Navigation Guidance | | Prompts | 6 | No | 0 | | Variable | 130 | 160 | C | Driver | 1.0 |
| 15 | Play ATMOS demo sounds | | Atmos Media | 2 | No | 0 | | Variable | 0 | | ALL | X,Y Panner | 7.1.4 |
| 16 | *Gear P* | 53dB | Chime 2 | 3 | No | 0 | N/A | 200 | N/A | 200 | C | N/A | 2.0 |

FIG. 3

ATTRIBUTE UTILIZATION TO DELIVER IMMERSIVE SIMULTANEOUS SOUND EXPERIENCE

CROSS-REFERENCE TO RELATED APPLICATION

This application is a 35 U.S.C. § 371 National Phase Entry Application from PCT Application No. PCT/US2022/078871, filed on Oct. 28, 2022, entitled “ATTRIBUTE UTILIZATION TO DELIVER IMMERSIVE SIMULTANEOUS SOUND EXPERIENCE”, and designating the U.S., which claims priority to U.S. Provisional Patent Application No. 63/263,296, filed on Oct. 29, 2021, and entitled “Attribute Utilization to Deliver Immersive Simultaneous Sound Experience,” the disclosures of which are incorporated by reference herein in their entireties.

TECHNICAL FIELD

This disclosure relates to rendering of audio in a vehicle, in particular, to techniques of using predefined attributes of sounds to deliver an immersive simultaneous sound experience for occupants of the vehicle.

BACKGROUND

Some vehicles manufactured nowadays are equipped with one or more types of systems that can sense objects outside the vehicle and that can handle, at least in part, operations relating to the driving of the vehicle. Some such assistance involves automatically surveying surroundings of the vehicle and being able to take action regarding detected vehicles, pedestrians, or objects. When the surveillance is performed during travel, a faster response time from the system is generally preferred as it may increase the amount of time available to take remedial action after detection.

SUMMARY

In some aspects, the techniques described herein relate to a vehicle including: a plurality of loudspeakers; memory storing a plurality of pre-stored sound files, each sound file encoding a sound for rendering by one or more of loudspeakers of the plurality of loudspeakers; memory storing an attribute file containing attributes associated with the rendered sounds and associated with a plurality of audio streams, the attributes defining one or more parameters for rendering each of the sounds and the audio streams; an audio manager configured for receiving a plurality of the pre-stored sound files and a plurality of audio streams and configured for receiving attributes from the attribute file, the received attributes corresponding to the received plurality of pre-stored sound files and the plurality of audio files, wherein the audio manager is configured for, based on the received attributes, determining relative priorities for rendering the received plurality of the pre-stored sound files and the received plurality of audio streams; and an audio mixer configured for, based on the determined relative priorities, outputting signals to the plurality of loudspeakers to render the received plurality of the pre-stored sound files and the received plurality of audio streams according to the determined relative priorities.

In some aspects, the techniques described herein relate to a vehicle, wherein the attribute file is a tabular file.

In some aspects, the techniques described herein relate to a vehicle or claim 2, wherein the attribute file includes an xml file.

In some aspects, the techniques described herein relate to a vehicle, wherein the attributes associated with a sound include a quantitative rank of the sound relative to other rendered sounds, wherein the quantitative rank determines how two sounds are rendered relative to each other when the two sounds are scheduled to be rendered simultaneously.

In some aspects, the techniques described herein relate to a vehicle, wherein the audio streams include at least one of a radio broadcast, a streaming music service, an audiobook, or navigation instructions, and wherein the pre-stored sound files encode sounds representing audible alerts provided to occupants of the vehicle.

In some aspects, the techniques described herein relate to a vehicle, wherein the attributes associated with a sound include a quantitative rank of the sound relative to other rendered sounds, wherein the quantitative rank determines how two sounds are rendered relative to each other when the two sounds are scheduled to be rendered simultaneously.

In some aspects, the techniques described herein relate to a vehicle, wherein the attributes associated with a sound include a relative priority of the sound relative to other rendered sounds, wherein the relative priority determines whether, when the sound and the other sounds are scheduled to be rendered simultaneously, the other sounds are not to be rendered, a volume of the other sounds shall be reduced, or the other sounds shall be rendered without any changes.

In some aspects, the techniques described herein relate to a method of rendering audio signals over a plurality of loudspeakers in a vehicle, the method including: memory a plurality of pre-stored sound files, each sound file encoding a sound for rendering by one or more of loudspeakers of the plurality of loudspeakers; storing an attribute file containing attributes associated with the rendered sounds and associated with a plurality of audio streams, the attributes defining one or more parameters for rendering each of the sounds and the audio streams; receiving a plurality of the pre-stored sound files and a plurality of audio streams and configured for receiving attributes from the attribute file, the received attributes corresponding to the received plurality of pre-stored sound files and the plurality of audio files; determining, based on the received attributes, relative priorities for rendering the received plurality of the pre-stored sound files and the received plurality of audio streams; and outputting, based on the determined relative priorities, signals to the plurality of loudspeakers to render the received plurality of the pre-stored sound files and the received plurality of audio streams according to the determined relative priorities.

In some aspects, the techniques described herein relate to a method, wherein the attribute file is a tabular file.

In some aspects, the techniques described herein relate to a method or claim 9, wherein the attribute file includes an xml file.

In some aspects, the techniques described herein relate to a method, further including updating values of the attribute file without changing executable code that controls operation of an audio manager that determines, based on the received attributes, the relative priorities for rendering the received plurality of the pre-stored sound files and the received plurality of audio streams.

In some aspects, the techniques described herein relate to a method—11, wherein the attributes associated with a sound include a quantitative rank of the sound relative to other rendered sounds, and the method further including: determines, based on the quantitative rank, how two sounds are rendered relative to each other when the two sounds are scheduled to be rendered simultaneously.

In some aspects, the techniques described herein relate to a method—12, wherein the audio streams include at least one of a radio broadcast, a streaming music service, an audiobook, or navigation instructions, and wherein the pre-stored sound files encode sounds representing audible alerts provided to occupants of the vehicle.

In some aspects, the techniques described herein relate to a method—13, wherein the attributes associated with a sound include a quantitative rank of the sound relative to other rendered sounds, wherein the quantitative rank determines how two sounds are rendered relative to each other when the two sounds are scheduled to be rendered simultaneously.

In some aspects, the techniques described herein relate to a method—14, wherein the attributes associated with a sound include a relative priority of the sound relative to other rendered sounds, wherein the relative priority determines whether, when the sound and the other sounds are scheduled to be rendered simultaneously, the other sounds are not to be rendered, a volume of the other sounds shall be reduced, or the other sounds shall be rendered without any changes.

BRIEF DESCRIPTION OF DRAWINGS

FIG. 3 is an example table of a plurality of different sounds identified by an ID number ("ID") in a first column of the table and listing values for a plurality of different attributes of the sounds in other columns of the table.

DETAILED DESCRIPTION

Figure 1:
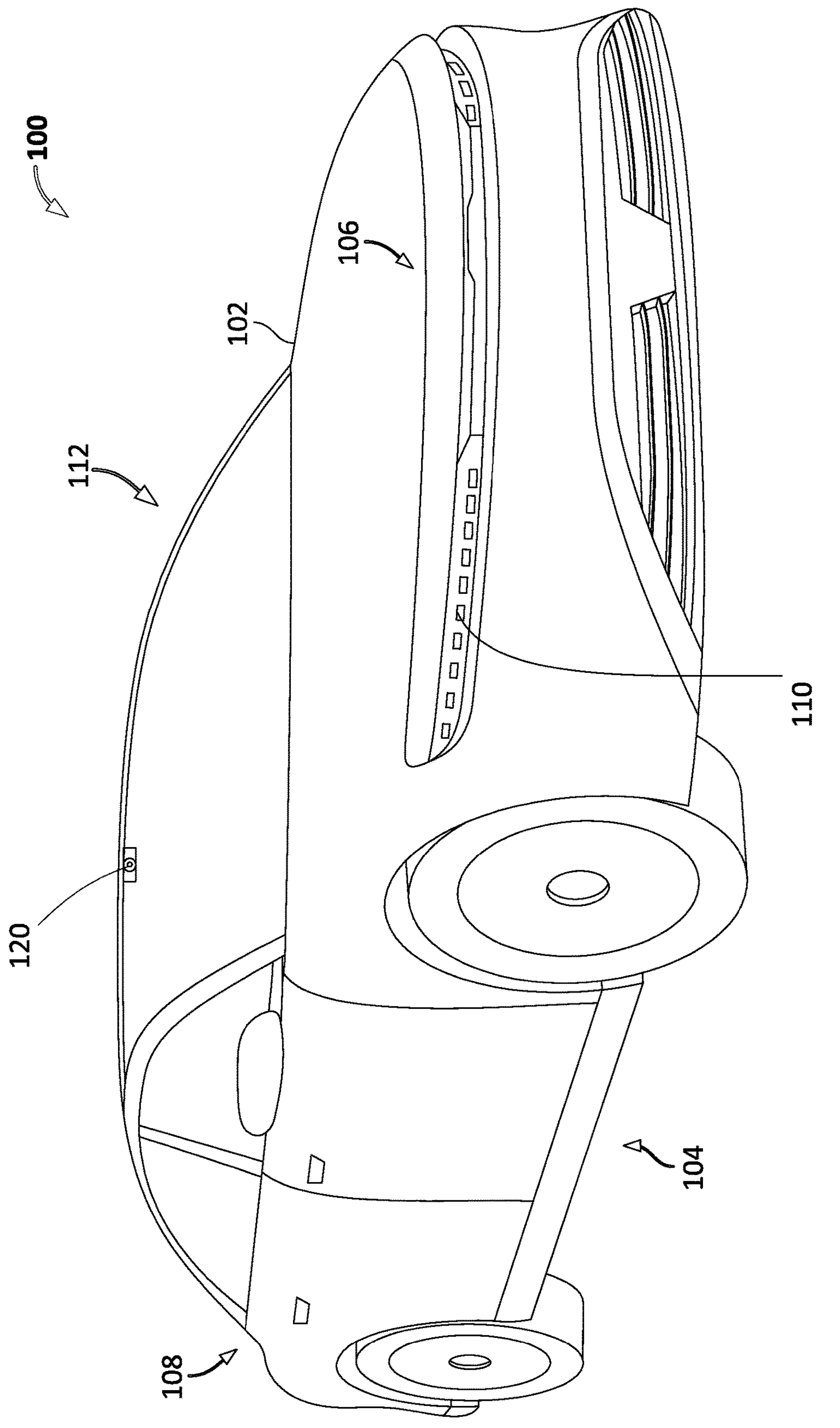
FIG. 1 shows an example of a vehicle.

Some vehicles manufactured nowadays are equipped with a large number of loudspeakers, with sophisticated audio processing equipment, with a multitude of sensors for detecting conditions in and around the vehicle, and with many different audio sources. This permits the rendering of many (e.g., hundreds of) different sounds from the loudspeakers to the occupants of the vehicle. The sounds can be rendered based on different triggers and in different contexts. Some vehicles can render a number (e.g., 16, 32) different sounds simultaneously with the use of complex audio rending techniques. Managing the rendering of all the different sounds in different contexts is complicated, especially when different sounds are rendered at the same time and arbitration between the different sounds may be necessary. Moreover, updating the management of the different sounds can be cumbersome and resource-intensive, sometimes requiring the installation of large source code and firmware updates to systems of the vehicle.

Techniques are disclosed herein that enable a software driven sound experience that can be tailored to specific needs without requiring code changes. The sounds can be dynamically distributed to multiple playback channels to provide augmented reality to suit the natural human intuitive auditory perception of situation awareness. Rendering of the sounds also can be prioritized when multiple audible alerts are active, to bring focus to more important sounds for increased safety. The same system also enables delivery of enhanced surround sound for the enjoyment of immersive experience in entertainment.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

As used herein, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

Examples herein refer to a vehicle body. A vehicle body is the main supporting structure of a vehicle to which components and subcomponents are attached. In vehicles having unibody construction, the vehicle body and the vehicle chassis are integrated into each other. As used herein, a vehicle chassis is described as supporting the vehicle body also when the vehicle body is an integral part of the vehicle chassis. The vehicle body often includes a passenger compartment with room for one or more occupants; one or more trunks or other storage compartments for cargo; and various panels and other closures providing protective and/or decorative cover.

Examples herein refer to assisted driving. In some implementations, assisted driving can be performed by an assisted-driving (AD) system, including, but not limited to, an autonomous-driving system. For example, an AD system can include an advanced driving-assistance system (ADAS). Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. An AD system can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., LiDAR); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); an inertial measurement unit; a torque sensor; a temperature sensor (e.g., a primary or secondary thermometer); a pressure sensor (e.g., for ambient air or a component of the vehicle); a humidity sensor (e.g., a rain detector); or a seat occupancy sensor.

FIG. 1 shows an example of a vehicle 100. The vehicle 100 can be used with one or more other examples described elsewhere herein. The vehicle 100 includes a vehicle body 102 and a vehicle chassis 104 supporting the vehicle body 102. For example, the vehicle body 102 is here of a four-door type with room for at least four occupants, and the vehicle chassis 104 has four wheels. Other numbers of doors, types of vehicle body 102, and/or kinds of vehicle chassis 104 can be used in some implementations.

The vehicle body 102 has a front 106 and a rear 108 and can have a passenger cabin 112 between the front and the rear. The vehicle 100 can have at least one motor, which can be positioned in one or more locations of the vehicle 100. In some implementations, the motor(s) can be mounted generally near the front 106, generally near the rear 108, or both. A battery module can be supported by chassis 104, for example, below the passenger cabin and can be used to power the motor(s). The vehicle 100 can have at least one lighting component, which can be situated in one or more locations of the vehicle 100. For example, the vehicle 100 can have one or more headlights 110 mounted generally near the front 106.

The vehicle can include multiple sensors (e.g., optical, infrared, ultrasonic, pressure, acoustic, etc.) configured for sensing conditions of, in, and around the vehicle. For example, the vehicle can include at least one camera 120. In some implementations, the camera 120 can include any image sensor whose signal(s) the vehicle 100 processes to perform one or more AD functions. For example, the camera 120 can be oriented in forward-facing direction relative to the vehicle (i.e., facing toward the front 106 of the vehicle 100) and can capture images of scenes in front of the vehicle, where the captured images can be used for detecting vehicles, lanes, lane markings, curbs, and/or road signage. The camera 120 can detect the surroundings of the vehicle 100 by visually registering a circumstance in relation to the vehicle 100. The vehicle also can include sensors, such as, for example, microphones, tire pressure gauges, thermistors, voltmeters, current meters, fluid pressure and level sensors, etc. configured for sensing conditions of, in, and around the vehicle.

The vehicle 100 can include one or more processors (not shown) that can process information captured by the sensors. For example, a processor can process images captured by the camera 120, for example, using one or more machine vision algorithms or techniques, to perform various tasks related to one or more driving functions. For example, captured images can be processed to detect lane markings on a roadway upon which the vehicle is moving.

The vehicle 100 can include a plurality of loudspeakers to render audible sounds to the driver and passengers within the vehicle. For example, the vehicle 100 can include a sufficient number of loudspeakers (e.g., at least five loudspeakers and a subwoofer) positioned at different locations within the vehicle and configured to render an immersive, surround sound audio experience to occupants of the vehicle. In some implementations, a sufficient number (e.g., at least seven loudspeakers and a subwoofer) of loudspeakers to provide a surround sound audio experience in three dimensions. In some implementations, additional loudspeakers, beyond the minimum number required to render a surround sound experience, can be provided in the vehicle.

Figure 2:
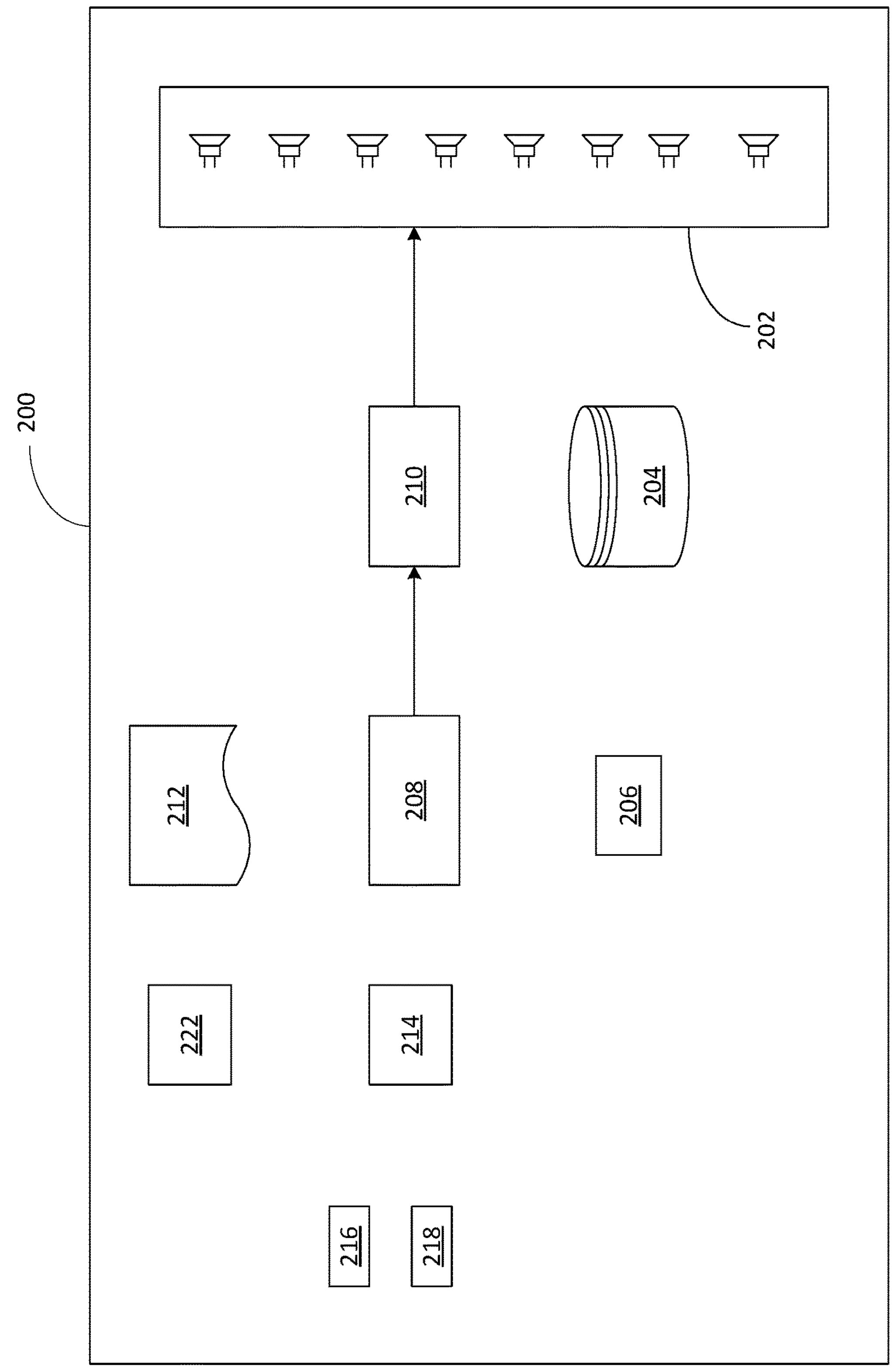
FIG. 2 is a schematic diagram of a sound system configured for rendering a plurality of sounds over an array of loudspeakers to occupants of a vehicle.

FIG. 2 is a schematic diagram of a sound system 200 configured for rendering a plurality of sounds over an array of loudspeakers 202 to occupants of a vehicle. The plurality of sounds can include any number of different sounds (e.g., hundreds or more), and the system 200 can render a subset (e.g., up to 16, up to 32, up to 64) of the different sounds simultaneously over the array of loudspeakers 202. The sounds that are rendered can be provided from one or more pre-stored audio files (e.g., wave files, MP3 files, etc.) stored in a memory 204 of the sound system 200. For example, the pre-stored audio files can include files that can be used for rendering sounds representing audible alerts corresponding to various notifications provided to occupants of the vehicle. The sounds that are rendered can be provided from one or more audio streams 206 (e.g., radio broadcasts, streaming music services, audiobooks, podcasts, turn-by-turn navigation instructions, etc.).

An audio manager 208 can manage and coordinate the rendering of the different sounds that are rendered to the array of loudspeakers 202 and route the various different sounds to an audio mixer 210 that outputs signals to the array of loudspeakers 202 for rendering to occupants of the vehicle. With the possibility of rendering hundreds of different sounds and rendering many of the different sounds simultaneously, if the rendering is not handled properly, the audio output from the vehicle can also become a source of distraction and confusion for occupants of the vehicle. The ability to prioritize sounds and sound events can help maintain the driver's attention on proper control of the vehicle. With the integration of providing some or all of audible ADAS information, media information, phone calls, or messages, etc. through the audio system 200, the value and utility of organizing the rendered sounds and the functions of the audio system by the audio manager in a way that is both accessible and not overwhelming to the driver, whose primary responsibility is the safe handling of the vehicle and negotiation of roadway with other motorists, is paramount.

To perform this complex process of managing the rendering of hundreds of sounds from a multitude of sound sources, attributes (or parameters) can be assigned to the different sounds, where the attributes can be received as inputs to the audio manager 208, and then the audio manager 208 can control the rendering, coordination, and arbitration of the different sounds, many of which may be rendered simultaneously, based on the received attributes, by providing essential metadata and control information to the sound mixer 210. Attributes for the different sounds can be maintained in an attribute file 212, for example, in a tabular format, such as a table or spreadsheet that specifies a plurality of sound attributes for the rendering of each sound. Sound attributes also can include attributes that govern the rendering of different sounds, when the different sounds are rendered at the same time.

FIG. 3 is an example table 300 of a plurality of different sounds identified by an ID number ("ID") in a first column of the table and listing values for a plurality of different attributes of the sounds in other columns of the table. Attributes for a sound are used to instruct the audio manager 208 how to dynamically render each sound, and can govern the pipeline (or channel) used to render the sounds, the loudness, the volume, the fade-in and fade-out times, the speaker locations used to render the sounds, the sound format (e.g., mono, stereo, 5.1 surround sound, 7.1.4 surround sound), etc. used to render the sounds.

In addition, one or more attributes in the table can be used to prioritize the playback of different sounds that are simultaneously active (e.g., are scheduled for simultaneous rendering by the audio manager 208 or are actually simultaneously rendered by the array of loudspeakers 202).

For example, when the vehicle 100 is being operated on a roadway around other vehicles, and a traffic situation requires automatic emergency braking to avoid a collision, a sound associated with emergency braking can be defined to be exclusive so that no other sounds would be played from the array of loudspeakers 202, to draw sufficient attention from the driver to take action. In another example, when audible navigation guidance is rendered, the volume of music that is simultaneously played can be reduced temporarily, so that the driver can focus on the navigation guidance.

Thus, referring again to FIG. 3, when two sounds are scheduled for simultaneous rendering, a quantitative "Rank" attribute for the sounds can be used to arbitrate between the sounds, such that the sound with the highest rank dictates how other sounds should be perceived, if at all. For example, if sound with ID=1 and corresponding to a first phase audible alert about a detected forward collision warning and a forward automated emergency braking event is scheduled for rending while a sound with ID=7 corresponding to rendering a phone ring tone is scheduled for simultaneous rending, then the higher rank=12 of the first sound compared to the lower rank=7 of the second sound indicates that the sound with ID=7 dictates how the other sound(s) should be rendered. Columns labeled by "Duck Other" and "Delta loudness of the lower" determine how the other sounds (e.g., sound with ID=7 in the example above) are to be rendered. The value of the attribute for "Duck Others" indicates whether the other sound should be turned off entirely (when the value is "Exclusive"), whether the volume of the other sounds be reduced (e.g., when the value is "Yes", the value of "Delta loudness of the lower" determines by how much the volume of the other sounds should be reduced), or whether the other sounds should be rendered without any changes (when the value is "No").

The attributes for sounds stored in the attribute file 212 are metadata disjoint from the audio data of the pre-stored audio files stored in the memory 204 and audio data provided from the one or more streams 206, such that the attributes are easily used for controlling aspects about how sounds from the pre-stored files and the streams 206 are rendered, both individually and in relation to other sounds. In particular, the attributes can be easily modified and updated without requiring changes to the executable code that controls the operation of the audio manager 208 or mixer 210. Thus, this approach enables a flexible customization of the audio experience and allows modular testing of the behavior of the system 200 without invoking acoustics feedback into the test system for easy test automation.

Other sound attributes can be used to direct the audio manager how to render aspects of a sound, such as from which speaker(s) the sound is rendered, the amount of reverb for the sound, a venue simulation (e.g., movie theatre, living room, etc.) for the sound, minimum or maximum volume for the sound, and which seat to focus the sound on inside a vehicle cabin to immerse the listener in a simulated or augmented reality. For example, an unbuckled seat belt alert sound could be rendered from the direction of the seat that is not buckled up. Collision alert sounds can be rendered from the direction where hazard is looming, allowing a person to instinctively look in the direction of hazards and minimizing the reaction time necessary to avert an accident.

Referring again to FIG. 2, the audio manager 208 can receive sound event trigger signals 214 that initiate, or schedule, the rendering of a sound. The sound trigger signal 214 can be generated by one or more conditions. For example, a sound event trigger signal can be generated based on input from one or more sensors 216 of the vehicle 100. For example, when an outward facing camera registers images a roadway upon which the vehicle is traveling, the images may be processed to indicate that the vehicle is departing, or is about to depart from, a roadway lane in which the vehicle is traveling, and a sound event trigger signal 214 to play a lane departure warning sound may be generated in response to the sensory input. In another example, the sound event trigger signal 214 can be generated based on input from one or more human-machine user interfaces 218 of the vehicle, such as, for example, actuation of a turn signal, actuation of a cruise control mode of the vehicle, opening of a door of the vehicle, and so on. In another example, the sound event trigger signal 214 can be generated based on input from one or more audio or media devices, or coupled to, the vehicle 100. For example, an audio/media receiver of the vehicle can receive sound data from one or more streaming services (e.g., satellite radio, music library streaming services, navigation services), or a computing device (e.g., a mobile phone, a media player, etc.) can be coupled (e.g., over a wireless connection) to the vehicle and provide sound data to the vehicle, and the reception of the sound data by the vehicle or the provision of the sound data to the vehicle can initiate a sound event trigger signal 214.

Receipt of a sound event trigger signal 214 by the audio manager 208 can initiate the scheduling of a sound for rendering by the array of loudspeakers 202. In response to the received sound event trigger signal 214, the audio manager 208 can also receive attributes for the sound to be rendered from the attribute file 212 and compare the received attributes to act before sounds that are already being rendered by the array of loudspeakers to determine how to render all of the sounds that are scheduled for rendering. In addition, the audio manager 208 can receive dynamic input information 222 that can be used to determine how to render one or more sounds. For example, when a sound event trigger signal 214 is received by the audio manager 208, where the signal 214 is related to a sensory input indicating that a seatbelt is unbuckled and that an unbuckled seatbelt audible alert should be rendered, dynamic input information 222 can be received indicating which seatbelt within the vehicle is unbuckled. The dynamic input information 222 can be used as an additional dynamic attribute that can be used to control how a sound is rendered. For example, in the example of an unbuckled seatbelt audible alert, a single pre-stored audio file can be stored in the memory 204, and the dynamic input information can be used to determine the location of the speaker(s) to render the audio file (e.g., loudspeakers near the driver if the driver's seatbelt is unbuckled or loudspeakers near the right beer passenger if the right rear passenger's seatbelt is unbuckled).

The sound attributes can be stored in a file, e.g., a tabular file, such as, for example, an xml file that can be easily imported to the audio manager 208 to provide metadata information that governs the rendering of sounds within the vehicle. In this approach, information governing the rendering of sounds can be easily updated by updating the attributes in the file, without having to update executable code that programs the audio manager 208. Because the intermediate output from the audio manager 208 is control information and is not audible sounds, this makes it very easy to write test cases that can verify the expected output from the audio manager 208, given any scenarios with combinations of sound events. Thus, techniques are provided herein for scaling the number of sounds that can be managed by the audio system 200 and allowing dynamic runtime input to augment the sound attributes without rewriting the code that handles the sound. In other words, the source code for audio manager does not need to change, attributes of the sounds are adjusted.

Figure 4:
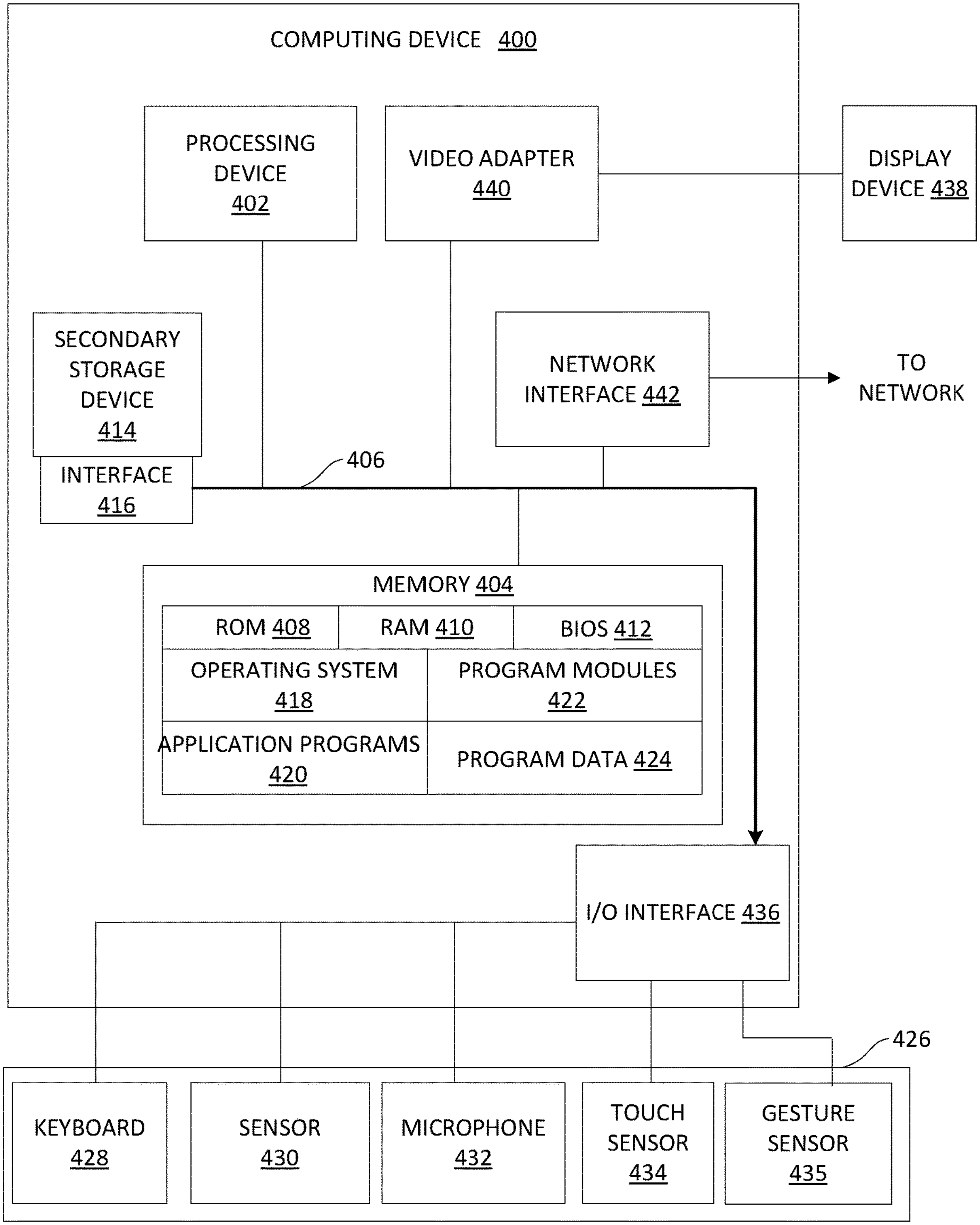
FIG. 4 illustrates an example architecture of a computing device that can be used to implement aspects of the present disclosure, including any of the systems, apparatuses, and/or techniques described herein, or any other systems, apparatuses, and/or techniques that may be utilized in the various possible embodiments.

FIG. 4 illustrates an example architecture of a computing device 400 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 4 can be used to execute the operating system, application programs, and/or software modules (including the software engines) described herein.

The computing device 400 includes, in some embodiments, at least one processing device 402 (e.g., a processor), such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures that can be used, including, but not limited to, a memory bus, or memory controller; a peripheral bus; and a local bus using any of a variety of bus architectures.

The system memory 404 includes read only memory 408 and random access memory 410. A basic input/output system 412 containing the basic routines that act to transfer information within computing device 400, such as during start up, can be stored in the read only memory 408.

The computing device 400 also includes a secondary storage device 414 in some embodiments, such as a hard disk drive, for storing digital data. The secondary storage device 414 is connected to the system bus 406 by a secondary storage interface 416. The secondary storage device 414 and its associated computer readable media provide non-volatile and non-transitory storage of computer readable instructions (including application programs and program modules), data structures, and other data for the computing device 400.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 414 and/or system memory 404, including an operating system 418, one or more application programs 420, other program modules 422 (such as the audio manager described herein), and program data 424. The computing device 400 can utilize any suitable operating system.

In some embodiments, a user provides inputs to the computing device 400 through one or more input devices 426. Examples of input devices 426 include a keyboard 428, sensor 430, microphone 432 (e.g., for voice and/or other audio input), touch sensor 434 (such as a touchpad or touch sensitive display), and gesture sensor 435 (e.g., for gestural input). In some implementations, the input device(s) 426 provide detection based on presence, proximity, and/or motion. Other embodiments include other input devices 426. The input devices can be connected to the processing device 402 through an input/output interface 436 that is coupled to the system bus 406. These input devices 426 can be connected by any number of input/output interfaces, such as a parallel port, serial port, game port, or a universal serial bus. Wireless communication between input devices 426 and the input/output interface 436 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 438, such as a monitor, liquid crystal display device, light-emitting diode display device, projector, or touch sensitive display device, is also connected to the system bus 406 via an interface, such as a video adapter 440. In addition to the display device 438, the computing device 400 can include various other peripheral devices (not shown), such as loudspeakers.

The computing device 400 can be connected to one or more networks through a network interface 442. The network interface 442 can provide for wired and/or wireless communication. In some implementations, the network interface 442 can include one or more antennas for transmitting and/or receiving wireless signals. When used in a local area networking environment or a wide area networking environment (such as the Internet), the network interface 442 can include an Ethernet interface. Other possible embodiments use other communication devices. For example, some embodiments of the computing device 400 include a modem for communicating across the network.

The computing device 400 can include at least some form of computer readable media. Computer readable media includes any available media that can be accessed by the computing device 400. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

Figure 5:
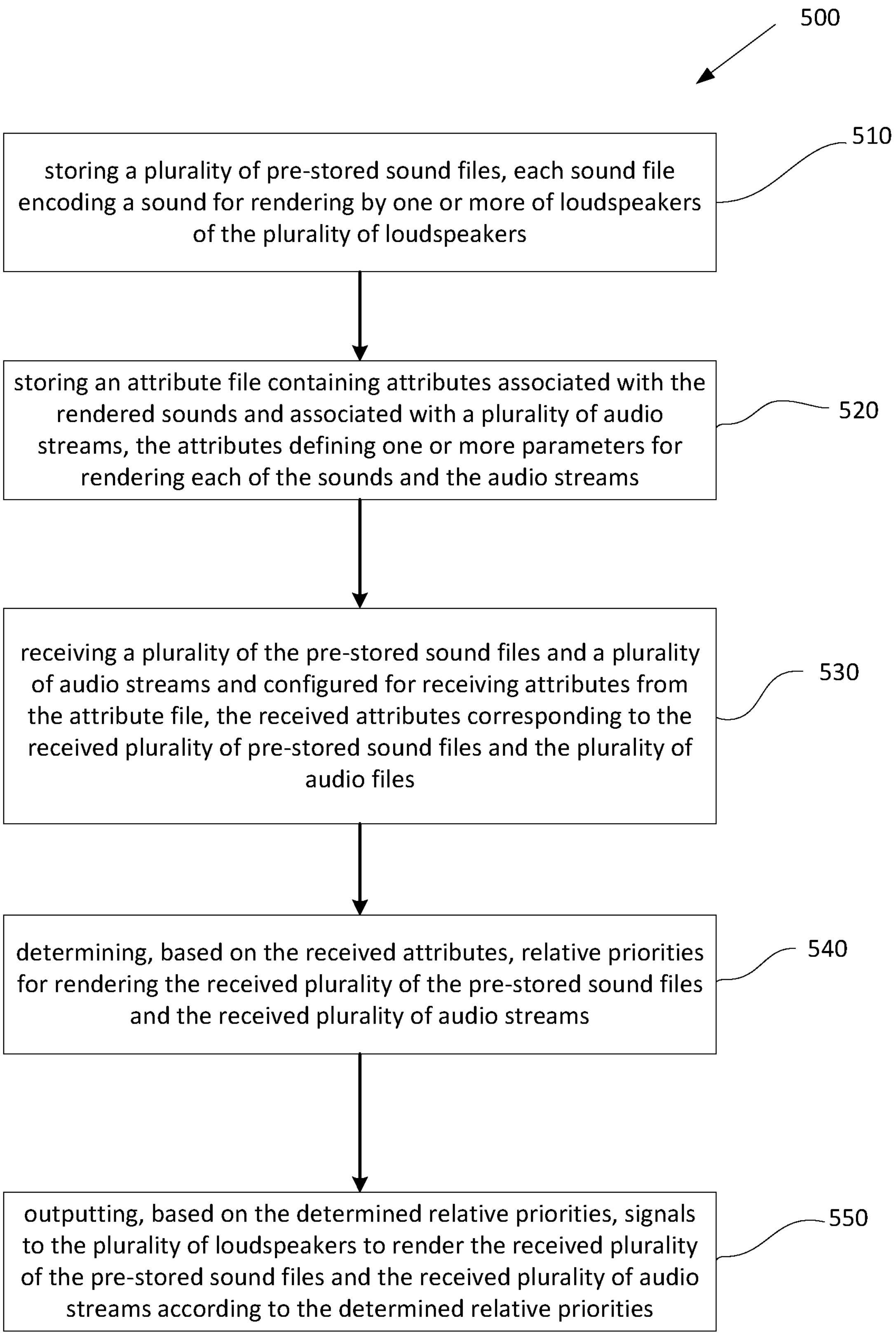
FIG. 5 is a flowchart of an example process for rendering audio signals over a plurality of loudspeakers in a vehicle.

FIG. 5 is a flowchart of an example process 500 for rendering audio signals over a plurality of loudspeakers in a vehicle. The process 500 includes, at step 510, storing a plurality of pre-stored sound files, each sound file encoding a sound for rendering by one or more of loudspeakers of the plurality of loudspeakers. The process 500 includes, at step 520, storing an attribute file containing attributes associated with the rendered sounds and associated with a plurality of audio streams, the attributes defining one or more parameters for rendering each of the sounds and the audio streams.

The process 500 includes, at step 530, receiving a plurality of the pre-stored sound files and a plurality of audio streams and configured for receiving attributes from the attribute file, the received attributes corresponding to the received plurality of pre-stored sound files and the plurality of audio files. The process 500 includes, at step 540, determining, based on the received attributes, relative priorities for rendering the received plurality of the pre-stored sound files and the received plurality of audio streams. The process 500 includes, at step 550, outputting, based on the determined relative priorities, signals to the plurality of loudspeakers to render the received plurality of the pre-stored sound files and the received plurality of audio streams according to the determined relative priorities.

The terms "substantially" and "about" used throughout this Specification are used to describe and account for small fluctuations, such as due to variations in processing. For example, they can refer to less than or equal to +5%, such as less than or equal to +2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of subject matter appearing in this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems.

While certain features of the described implementations have been illustrated as described herein, many modifications, substitutions, changes and equivalents will now occur to those skilled in the art. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore, the disclosures and descriptions herein are intended to be illustrative, but not limiting, of the scope of the invention.

What is claimed is:

1. A vehicle comprising:

a plurality of loudspeakers;

memory storing a plurality of pre-stored sound files, each sound file encoding a sound for rendering by one or more of loudspeakers of the plurality of loudspeakers;

memory storing an attribute file containing attributes associated with the rendered sounds and associated with a plurality of audio streams, the attributes defining one or more parameters for rendering each of the sounds and the audio streams;

an audio manager configured for receiving a plurality of the pre-stored sound files and a plurality of audio streams and configured for receiving attributes from the attribute file, the received attributes corresponding to the received plurality of pre-stored sound files and the plurality of audio files, wherein the audio manager is configured for, based on the received attributes, determining relative priorities for rendering the received plurality of the pre-stored sound files and the received plurality of audio streams; and an audio mixer configured for, based on the determined relative priorities, outputting signals to the plurality of loudspeakers to render the received plurality of the pre-stored sound files and the received plurality of audio streams according to the determined relative priorities.

2. The vehicle of claim 1, wherein the attribute file is a tabular file.

3. The vehicle of claim 1, wherein the attribute file includes an xml file.

4. The vehicle of claim 1, wherein the attributes associated with a sound include a quantitative rank of the sound relative to other rendered sounds, wherein the quantitative rank determines how two sounds are rendered relative to each other when the two sounds are scheduled to be rendered simultaneously.

5. The vehicle of claim 1, wherein the audio streams include at least one of a radio broadcast, a streaming music service, an audiobook, or navigation instructions, and wherein the pre-stored sound files encode sounds representing audible alerts provided to occupants of the vehicle.

6. The vehicle of claim 1, wherein the attributes associated with a sound include a quantitative rank of the sound relative to other rendered sounds, wherein the quantitative rank determines how two sounds are rendered relative to each other when the two sounds are scheduled to be rendered simultaneously.

7. The vehicle of claim 1, wherein the attributes associated with a sound include a relative priority of the sound relative to other rendered sounds, wherein the relative priority determines whether, when the sound and the other sounds are scheduled to be rendered simultaneously, the other sounds are not to be rendered, a volume of the other sounds shall be reduced, or the other sounds shall be rendered without any changes.

8. A method of rendering audio signals over a plurality of loudspeakers in a vehicle, the method comprising:

storing a plurality of pre-stored sound files, each sound file encoding a sound for rendering by one or more of loudspeakers of the plurality of loudspeakers;

storing an attribute file containing attributes associated with the rendered sounds and associated with a plurality of audio streams, the attributes defining one or more parameters for rendering each of the sounds and the audio streams;

receiving a plurality of the pre-stored sound files and a plurality of audio streams and configured for receiving attributes from the attribute file, the received attributes corresponding to the received plurality of pre-stored sound files and the plurality of audio files;

determining, based on the received attributes, relative priorities for rendering the received plurality of the pre-stored sound files and the received plurality of audio streams; and outputting, based on the determined relative priorities, signals to the plurality of loudspeakers to render the received plurality of the pre-stored sound files and the received plurality of audio streams according to the determined relative priorities.

9. The method of claim 8, wherein the attribute file is a tabular file.

10. The method of claim 8, wherein the attribute file includes an xml file.

11. The method of claim 9, further comprising updating values of the attribute file without changing executable code that controls operation of an audio manager that determines, based on the received attributes, the relative priorities for rendering the received plurality of the pre-stored sound files and the received plurality of audio streams.

12. The method of claim 8, wherein the attributes associated with a sound include a quantitative rank of the sound relative to other rendered sounds, and the method further comprising:

determines, based on the quantitative rank, how two sounds are rendered relative to each other when the two sounds are scheduled to be rendered simultaneously.

13. The method of claim 8, wherein the audio streams include at least one of a radio broadcast, a streaming music service, an audiobook, or navigation instructions, and wherein the pre-stored sound files encode sounds representing audible alerts provided to occupants of the vehicle.

14. The method of claim 8, wherein the attributes associated with a sound include a quantitative rank of the sound relative to other rendered sounds, wherein the quantitative rank determines how two sounds are rendered relative to each other when the two sounds are scheduled to be rendered simultaneously.

15. The method of claim 8, wherein the attributes associated with a sound include a relative priority of the sound relative to other rendered sounds, wherein the relative priority determines whether, when the sound and the other sounds are scheduled to be rendered simultaneously, the other sounds are not to be rendered, a volume of the other sounds shall be reduced, or the other sounds shall be rendered without any changes.

16. The vehicle of claim 1, wherein the attributes received from the attribute file include one or more attributes defining at least one of speaker locations used to render a pre-stored sound file or a seat within a vehicle cabin to focus rendering of the pre-stored sound file, and wherein the audio manager is configured to receive dynamic input information identifying a vehicle context and, based on the one or more attributes and the dynamic input information, select a subset of the plurality of loudspeakers from which the pre-stored sound file is rendered.

17. The method of claim 8, wherein the attributes received from the attribute file include one or more attributes defining at least one of speaker locations used to render a pre-stored sound file or a seat within a vehicle cabin to focus rendering of the pre-stored sound file, and wherein the method further comprises receiving dynamic input information identifying a vehicle context and, based on the one or more attributes and the dynamic input information, selecting a subset of the plurality of loudspeakers from which the pre-stored sound file is rendered.

18. The vehicle of claim 1, wherein the plurality of pre-stored sound files includes a pre-stored alert sound file encoding an alert sound for rendering in a vehicle cabin, wherein the attributes received from the attribute file for the pre-stored alert sound file include at least one of speaker location information or a seat-focus attribute, and wherein the audio manager is configured to receive dynamic input information identifying a vehicle context and, based on the at least one of the speaker location information or the seat-focus attribute and the dynamic input information, select a subset of the plurality of loudspeakers from which the alert sound is rendered in the vehicle cabin.

19. The method of claim 8, wherein the plurality of pre-stored sound files includes a pre-stored alert sound file encoding an alert sound for rendering in a vehicle cabin, wherein the attributes received from the attribute file for the pre-stored alert sound file include at least one of speaker location information or a seat-focus attribute, and wherein the method further comprises receiving dynamic input information identifying a vehicle context and, based on the at least one of the speaker location information or the seat-focus attribute and the dynamic input information, selecting a subset of the plurality of loudspeakers from which the alert sound is rendered in the vehicle cabin.

* * * * *